(12) United States Patent
Schneider

(10) Patent No.: US 8,474,755 B2
(45) Date of Patent: Jul. 2, 2013

(54) SUPPLY UNIT FOR FLEXIBLE SUPPLY CHANNELS

(75) Inventor: Uwe Schneider, Jork (DE)

(73) Assignee: Airbus Operations GmbH (DE)

( * ) Notice: Subject to any disclaimer, the term of this patent is extended or adjusted under 35 U.S.C. 154(b) by 228 days.

(21) Appl. No.: 13/130,433

(22) PCT Filed: Oct. 26, 2009

(86) PCT No.: PCT/EP2009/064061
§ 371 (c)(1),
(2), (4) Date: May 20, 2011

(87) PCT Pub. No.: WO2010/057744
PCT Pub. Date: May 27, 2010

(65) Prior Publication Data
US 2011/0240796 A1  Oct. 6, 2011

Related U.S. Application Data

(60) Provisional application No. 61/199,815, filed on Nov. 20, 2008.

(30) Foreign Application Priority Data

Nov. 20, 2008 (DE) .......................... 10 2008 058 271

(51) Int. Cl.
*B64D 11/00* (2006.01)
(52) U.S. Cl.
USPC .................................... 244/118.5; 244/118.6

(58) Field of Classification Search
USPC ............................................ 244/118.5, 118.6
See application file for complete search history.

(56) References Cited

U.S. PATENT DOCUMENTS

| | | | | |
|---|---|---|---|---|
| 5,383,628 A | * | 1/1995 | Harriehausen et al. | 244/118.1 |
| 5,549,258 A | * | 8/1996 | Hart et al. | 244/118.1 |
| 5,556,332 A | * | 9/1996 | Schumacher | 454/76 |
| 5,651,733 A | * | 7/1997 | Schumacher | 454/76 |
| 5,687,929 A | * | 11/1997 | Hart et al. | 244/118.1 |
| 5,716,027 A | * | 2/1998 | Hart et al. | 244/118.1 |
| 5,842,668 A | * | 12/1998 | Spencer | 244/118.1 |
| 5,921,670 A | * | 7/1999 | Schumacher et al. | 362/480 |
| 5,938,149 A | * | 8/1999 | Terwesten | 244/118.5 |
| 6,454,209 B1 | * | 9/2002 | Bock et al. | 244/118.5 |
| 6,619,716 B1 | * | 9/2003 | Sturt | 296/37.8 |
| 6,633,347 B2 | * | 10/2003 | Kitazawa | 348/837 |
| 6,874,730 B2 | * | 4/2005 | Harasta | 244/118.5 |
| 7,379,125 B2 | * | 5/2008 | Chang | 348/837 |

(Continued)

FOREIGN PATENT DOCUMENTS

| | | |
|---|---|---|
| DE | 102005038131 A1 | 3/2006 |
| DE | 102007014406 B3 | 4/2008 |

(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

According to one exemplary embodiment of the invention, a service unit for being installed on a service channel of an aircraft is disclosed, wherein said service unit features a mounting device and a connecting device. These two devices cooperate in such a way that the mounting and the automatic connecting are realized in one step when the service unit is moved into the installation position.

14 Claims, 4 Drawing Sheets

U.S. PATENT DOCUMENTS

| | | | |
|---|---|---|---|
| 2004/0212746 A1* | 10/2004 | Rosen | 348/837 |
| 2004/0213005 A1* | 10/2004 | Kohlmeier-Beckmann et al. | 362/471 |
| 2006/0035502 A1* | 2/2006 | Tiesler et al. | 439/340 |
| 2006/0091257 A1* | 5/2006 | Melberg et al. | 244/118.5 |
| 2007/0133217 A1* | 6/2007 | Tiesler et al. | 362/459 |
| 2008/0150301 A1* | 6/2008 | Homner | 292/95 |
| 2010/0087130 A1* | 4/2010 | Nitsche et al. | 454/76 |
| 2010/0096919 A1* | 4/2010 | Meckes et al. | 307/9.1 |

FOREIGN PATENT DOCUMENTS

| | | |
|---|---|---|
| DE | 202006019165 U1 | 5/2008 |
| DE | 102006061455 A1 | 6/2008 |
| EP | 0436798 A2 | 7/1991 |
| EP | 0723911 A1 | 7/1996 |
| GB | 2417142 A | 2/2006 |
| WO | 2008116843 A2 | 10/2008 |

\* cited by examiner

Detail x

Cross-section A-A

SUPPLY UNIT FOR FLEXIBLE SUPPLY CHANNELS

CROSS-REFERENCE TO RELATED APPLICATIONS

This application is a national phase entry under 35 U.S.C. §371 of International Application No. PCT/EP2009/064061, filed Oct. 26, 2009, published in German, which claims the benefit of the filing date of U.S. Provisional Patent Application No. 61/199,815, filed Nov. 20, 2008, and of German Patent Application No. 10 2008 058 271.9, filed Nov. 20, 2008, the entire disclosures of which are hereby incorporated herein by reference.

FIELD OF THE INVENTION

The invention pertains to passenger service technology. The invention specifically pertains to a service unit for being installed on a service channel of a means of transport, to a service channel of a means of transport for accommodating such a service unit, to an aircraft, as well as to a method for installing a service unit on a service channel of a means of transport.

TECHNOLOGICAL BACKGROUND

In order to supply aircraft passengers with emergency oxygen, fresh air and electrical systems, a service channel (Passenger Service Channel, PSC-channel) equipped with functional panels, as well as so-called non-functional intermediate panels (also referred to as Infill Panels) is provided above the rows of seats in the direction of flight.

In order to mount any type of panel, it is common practice to use an intermediate rail system, in which the panels can be displaced in the direction of flight and locked with the aid of holders. The arrangement of the functional PSC-panels in the direction of flight needs to be configured individually for each aircraft layout with respect to the seat position such that the passenger can comfortably use any type of functionality from his seat.

The current installation sequence of these panels that are also referred to as PSUs (Passenger Service Units) begins with clicking the fasteners on the fuselage side into the PSC-rails. They are then flipped open, i.e., butt-jointed while being vertically suspended in the PSC-rails. The electrical plugs and air connections that are usually fixed to the underside of the luggage compartments (Hatracks) are then connected to the functional panels in this end position.

Before the still suspended PSUs can be flipped up into the horizontal position, all cables and hoses first need to be protected and fixed in accordance with construction requirements. In the above-described standard routine, one faces the installation problem that all components need to have a corresponding excessive length at the interfaces (for cables and/or hoses) in order to compensate incidental tolerances. These excessively long components ultimately need to be tied up, protected and fixed in the aircraft in a time-consuming fashion according to construction requirements.

EP 0 723 911 A1 and U.S. Pat. No. 5,651,733 disclose a passenger service arrangement in an aircraft cabin, particularly in an aircraft. The arrangement features a service unit with comfort and control elements such as a reading lamp, a flight attendant call button, a loudspeaker and an air nozzle. During the installation of the service unit, the service unit needs to be connected to the supply lines and then mechanically fixed.

SUMMARY OF THE INVENTION

It is the objective of the invention to make available a service unit for a means of transport that can be easily installed.

A service unit for being installed on a service channel of a means of transport, a service channel, an aircraft and a method according to the characteristics of the independent claims are disclosed. Additional developments of the invention result from the dependent claims.

The described exemplary embodiments likewise pertain to the service unit, the service channel, the aircraft and the method. In other words, characteristics that are described below, for example, with respect to the service unit can also be implemented in the aircraft or the method and vise versa.

According to one exemplary embodiment of the invention, a service unit for being installed on a service channel of a means of transport is disclosed, wherein said service unit features at least one service element for a passenger, a mounting device for mounting the service unit on the service channel and a connecting device for automatically connecting the service element to the service channel. In this case, the service unit and the service channel cooperate in such a way that the mounting and the automatic connecting are realized in one step.

In other words, the service unit can be mounted (fixed) on the service channel and the service element or service elements can be simultaneously connected to corresponding interfaces in the service channel by simply moving the service unit in the direction of the final installation position.

Additional steps are not required. It is no longer required, in particular, that the electrical lines and/or hoses/tubes have an excessive length.

According to another exemplary embodiment of the invention, the service element is selected from the group consisting of illumination unit, loudspeaker unit, symbol (Sign) and air nozzle.

The service unit naturally may also feature several of these service elements. For example, several illumination units, air nozzles, loudspeaker units and symbols may be integrated into one service unit. All of these service elements are automatically connected to the service channel when the service unit is moved into and mounted in its final installation position.

According to another exemplary embodiment of the invention, the service unit has a longitudinal direction, wherein a first service element is an electric consumer. The connecting device is designed for automatically connecting the electric consumer to the service channel and features at least one contact that extends in the longitudinal direction in order to realize the automatic electric contacting of the electric consumer during the mounting of the service unit.

For example, this contact extends over the entire length of the service unit or at least over a significant portion of its length.

According to another exemplary embodiment of the invention, the service unit features an air nozzle in order to provide an air current for a passenger, wherein the service unit furthermore features a channel for supplying the air from a pressurized region of the service channel to the air nozzle, and wherein the channel is designed for automatically producing a mechanically tight connection between the air nozzle and the pressurized region during the mounting of the service unit.

The air nozzle may be provided in addition to one or more electric consumers (loudspeaker, symbol, reading lamp) or alternatively thereto. It would also be possible to provide several air nozzles.

According to another exemplary embodiment of the invention, the mounting device features a snap-on device that extends in the longitudinal direction of the service unit. The mounting of the service unit can be easily realized by moving the service unit in the direction of its final installation position, wherein the snap-on device engages once the service unit is in the installation position.

No tools are required for this process.

According to another exemplary embodiment of the invention, the service unit already is completely preinstalled on the service channel before it is mounted such that no additional installation steps are required after the mounting and the thusly realized automatic connection.

In this way, the installation expenditures are significantly reduced.

According to another exemplary embodiment of the invention, the service unit has a lateral direction and features a profiling of V-shaped cross section that extends in the longitudinal direction of the service unit and serves for pre-centering the service unit in the lateral direction before it is mounted.

In other words, the service unit is automatically pre-centered when the service unit is moved into its installation position.

According to another exemplary embodiment of the invention, the service unit features teeth in order to fix the service unit in the longitudinal direction after it is mounted. In this way, the service unit can be prevented from moving in the longitudinal direction, for example, when the aircraft is subjected to a significant acceleration.

According to another exemplary embodiment of the invention, the means of transport is an aircraft. However, it may also be a rail vehicle, a bus or a ship.

According to another exemplary embodiment of the invention, a service channel of a means of transport for accommodating an above-described service unit is disclosed, wherein the service channel features a receptacle device for fixing the service unit with the aid of the mounting device and at least one interface for automatically connecting a service element of the service unit to the service channel.

According to another exemplary embodiment of the invention, the service channel features a first interface in order to realize the automatic electric contacting of an electric consumer of the service unit during the mounting of the service unit.

According to another exemplary embodiment of the invention, the service channel has a pressurized region and features a second interface for automatically producing a mechanically tight connection between an air nozzle of the service unit and the pressurized region during the mounting of the service unit.

The second interface may be provided additionally or alternatively to the first interface.

According to another exemplary embodiment of the invention, an aircraft with at least one above-described service unit and at least one above-described service channel is disclosed.

According to another exemplary embodiment of the invention, a method for installing a service unit on a service channel of a means of transport is disclosed, wherein the service unit is mounted on the service channel and a first service element is automatically connected to the service channel during the mounting process. In this case, the service unit and the service channel cooperate in such a way that the mounting and the automatic connecting are realized in one step.

According to another exemplary embodiment of the invention a second service element also is automatically connected to the service channel during the mounting process.

Further, additional service elements may also be automatically connected during the mounting process.

Exemplary embodiments of the invention are described below with reference to the figures.

DETAILED DESCRIPTION OF EXEMPLARY EMBODIMENTS

The figures show schematic illustrations that are not true-to-scale.

In the following description of the figures, identical or similar elements are identified by the same reference symbols.

Figure 1:
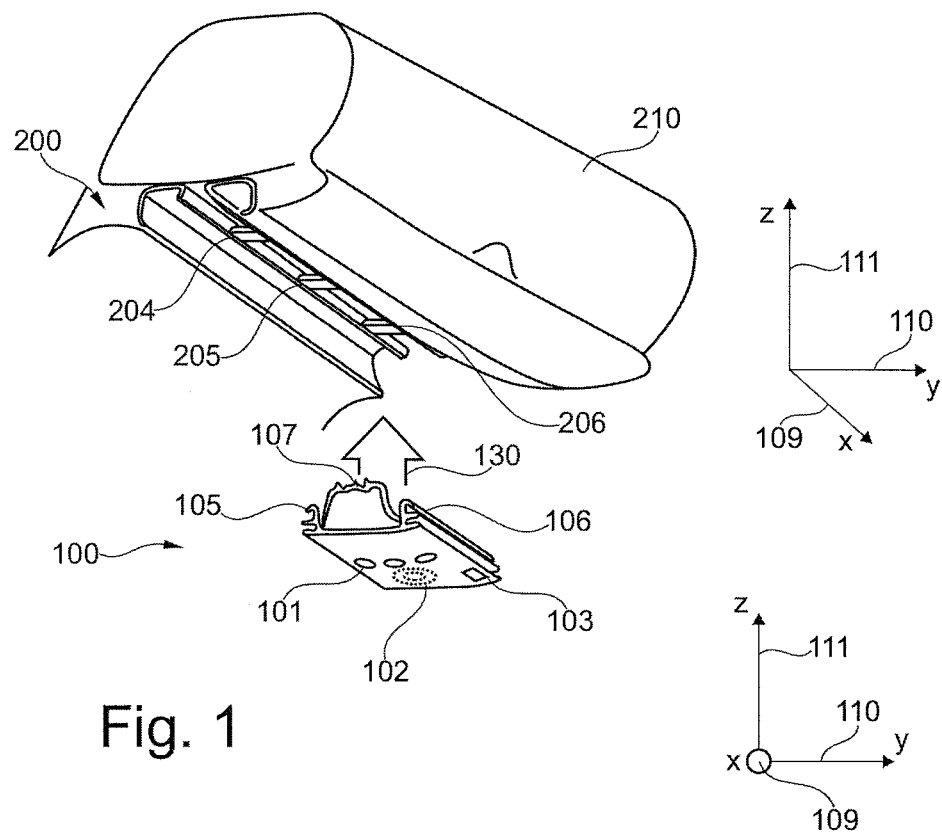
FIG. 1 shows a perspective representation of a luggage compartment with a service channel and a service unit to be attached thereto according to one exemplary embodiment of the invention.

FIG. 1 shows a perspective representation of a luggage compartment 210 with a service channel 200 attached thereto, as well as a service unit 100 to be attached to this service channel The service channel 200 features several connections 204, 205, 206 that may be arranged over the entire length of the service channel. These interfaces or connections consist, for example, of plugs with spring-loaded contacts that may be integrated into the mounting profile of the service channel 200. For example, three such interfaces are provided for each luggage compartment (Hatrack) that extends over four frames.

The service unit 100 consists of a module designed for servicing one or more passengers. It features several reading lamps 101, a loudspeaker 102 and a symbol (Sign) 103. This service unit (PSU-panel) has a corresponding roof profile and is already completely preassembled and fitted prior to the installation. The service unit 100 is mechanically interlocked and electrically connected simply by moving the service unit in the Z-direction 111 along the arrow 130.

In order to be interlocked on the service channel, the service unit 100 features longitudinal profiles 105, 106 that engage into corresponding mounting profile 208, 209 (see FIG. 2) of the service channel. In order to realize the connection of the electrical service elements, the service unit 100 features on its upper side a connecting device 107 in the form of one or more elongated electric contacts that can be contacted by corresponding contact pins of the spring-loaded contacts 204, 205, 206 when the service unit is installed. Due to the longitudinal extent of the strip contacts 107, it is not important at which X-position 109 the service unit 100 is exactly installed. If so required, it may also be subsequently shifted.

Figure 2:
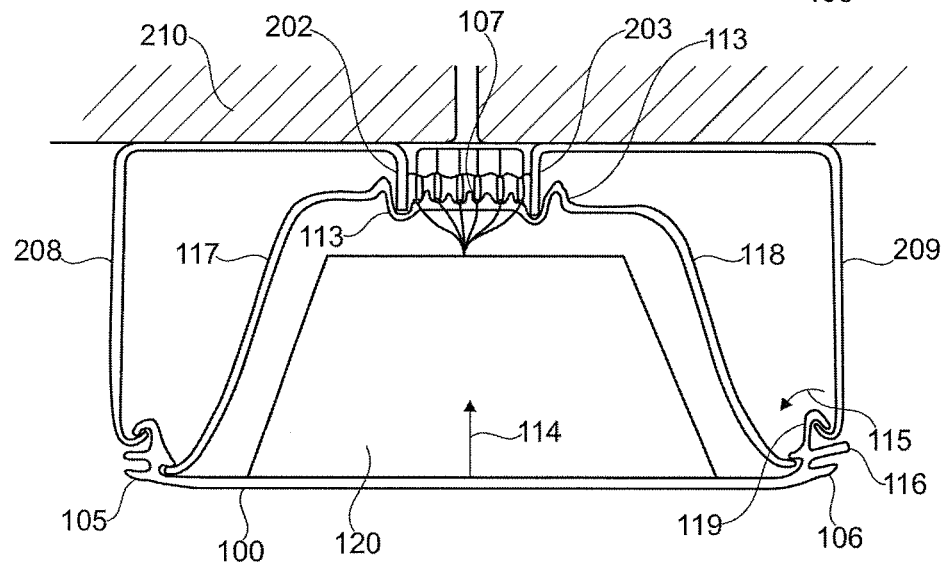
FIG. 2 shows a sectional representation of a service channel with a service unit attached thereto according to one exemplary embodiment of the invention.

FIG. 2 shows a cross section through the service channel 200 and a service unit 100 attached thereto. The service channel 200 is once again attached to a luggage compartment 210.

The service channel 200 features a left and a right outer lateral mounting profile 208, 209 and a left and a right inner lateral mounting profile 202, 203. The outer mounting profiles 208, 209 serve for engaging or interlocking with the mounting devices 105, 106 of the service unit. The mounting devices 105, 106 respectively feature a hook or have a hook-shaped mounting profile that corresponds to the mounting profiles 208, 209 of the service channel. The two profiles 208, 209 are forced to bend outward when the service unit is moved in the direction of the arrow 114. Once the highest point in the Z-direction 111 is reached, the two mounting profiles 208, 209 snap inward such that the service unit is interlocked. For this purpose, the mounting profiles 208, 209 are made of an elastic material such as, for example, plastic.

The arrangement is unlocked by moving the hook 119 of the service unit 100 along the arrow 115. This can be achieved, for example, by actuating the actuating lever 116.

The roof profile 117, 118 of the service unit 100 features two V-shaped profiles 113 that are designed for pre-centering the service unit in the lateral direction 110 when the service unit is moved in the direction of the final installation position. In this case, the inner mounting profiles 202, 203 engage into the corresponding V-shaped profiles 113 and guide the service unit into the correct Y-position during its upward movement.

The strip conductors for realizing the contacting are integrated into the roof profile of the service unit (see reference symbol 107). The reference symbol 120 designates a possible installation space for the various service elements.

Figure 3:
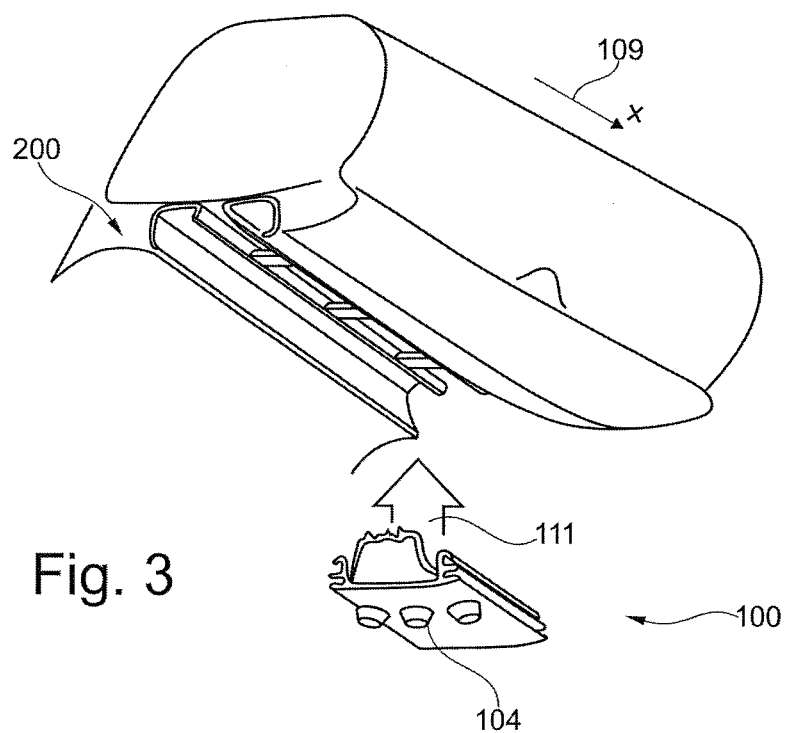
FIG. 3 shows a perspective representation of a luggage compartment with a service channel and a service unit to be attached thereto according to another exemplary embodiment of the invention.

FIG. 3 shows a luggage compartment with a service channel 200 attached thereto, as well as a service unit 100 to be attached to said service channel, according to another exemplary embodiment of the invention. In FIG. 3, the service unit 100 features three air nozzles 104 that are connected to the service channel simply by moving the service unit in the Z-direction 111.

This requires a corresponding seal between the luggage compartments and the panels in the X-direction 109. In this embodiment, it would naturally also be possible to integrate other service elements into the service unit 100 such as, for example, one or more lamps and/or one or more loudspeakers and/or one or more signs.

Figure 4:
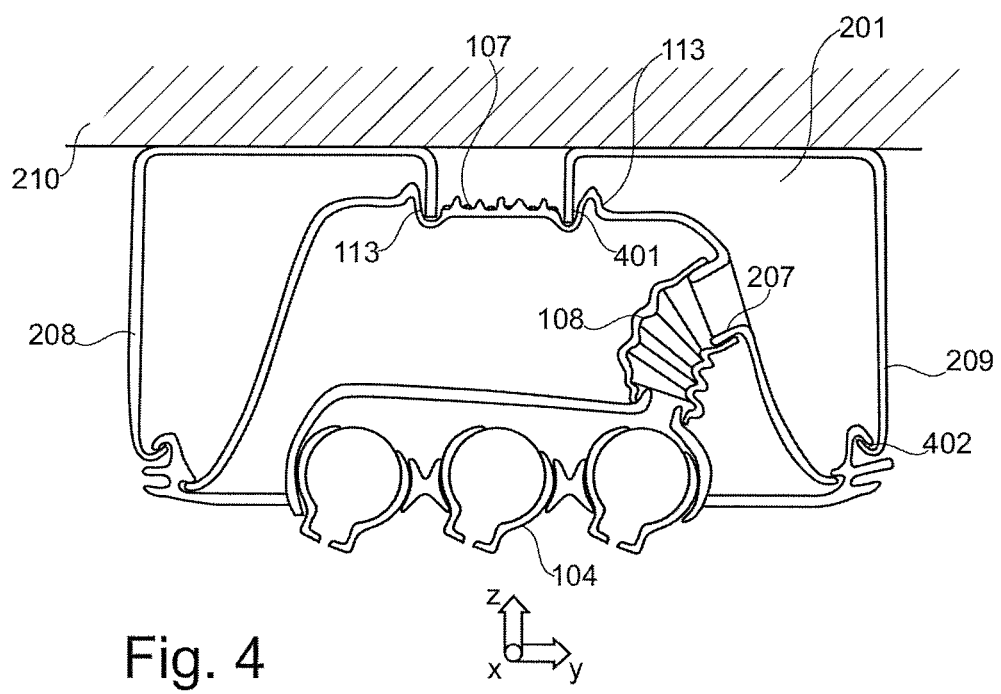
FIG. 4 shows a section through the service channel according to FIG. 3 with the service unit attached thereto.

FIG. 4 shows a sectional representation of the embodiment according to FIG. 3 with installed service unit. The reference symbol 201 identifies a pressurized region of the service channel. This pressurized region 201 features an outlet in the form of a tubular section 207, over which the hose 108 is placed. The pressurized region 201 is sealed simply by moving the service unit 100 in the Z-direction. If applicable, corresponding sealing elements are provided on the interfaces 401, 402 for this purpose. Due to the elastic design of the service unit 100, the interfaces 401, 402 press against one another when the service unit 100 is in the installation position.

Figure 5:
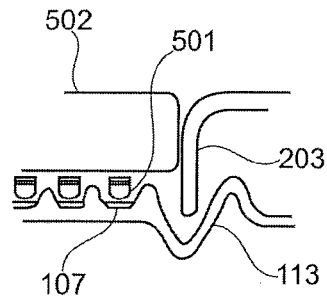
FIG. 5 shows a section through part of a service channel with a service unit connected thereto according to one exemplary embodiment of the invention.

FIG. 5 shows a detail of the sectional representation according to FIG. 2 in order to better elucidate the electric contacting between the service unit 100 and the service channel 200. A plug 502 provided in the service channel 200 features several spring-loaded pins 501 that contact the contact lines 107 of the service unit when it is in the installation position.

The V-shaped profile 113 serves for the Y-positioning and the compensation of tolerances.

Figure 6:
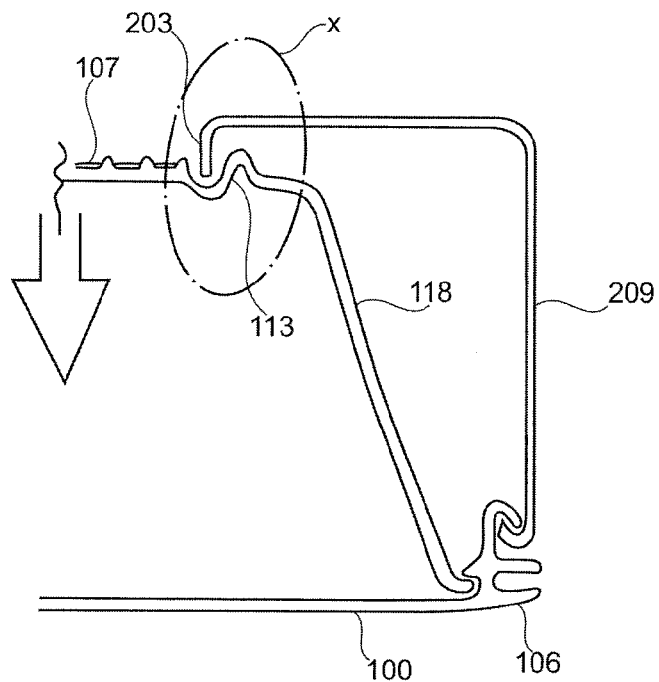
FIG. 6 shows a section through part of a service channel with a service unit connected thereto according to one exemplary embodiment of the invention.

FIG. 6 shows a cross section through part of a service unit and a service channel. The roof profile 118 is realized, for example, in the form of a continuously cast plastic profile with metal inserts. In service units with electric service elements, the metal inserts (electric lines) extend over their entire length (see reference symbol 107). The mounting profile 209 is also realized in the form of a continuously cast plastic profile.

When the service unit is moved upward during the installation, the roof profile 118 comes in contact with the webs 202, 203 of the service channel and presses the assembly into the interlocked position.

Due to the interlock between the service unit and the service channel in the region 106, the service unit with the roof profile is pulled upward (i.e., in the Z-direction).

Figure 7:
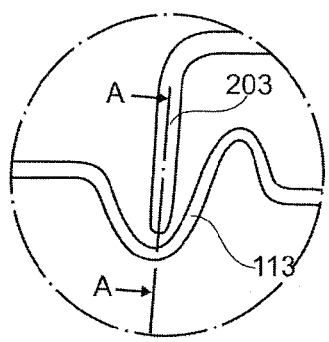
FIG. 7 shows a detail of FIG. 6.

FIG. 7 shows a cross-sectional representation of the detail X of FIG. 6 which elucidates the pre-centering for the installation in the Y/Z-direction. Due to the V-shaped design of the service unit in the region 113, the web 203 automatically guides the service unit into the correct Y-position and the correct Z-position during its movement.

Figure 8:
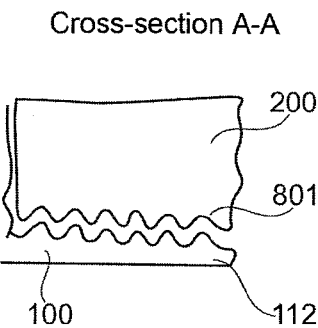
FIG. 8 shows a section along the line A-A in FIG. 7.

FIG. 8 shows a section along the line A-A in FIG. 7, wherein [text missing] features rolled-on fine teeth 112, 801 for fixing the service unit 100 on the service channel 200 in the X-direction. The fine teeth are rolled on during the continuous casting process, i.e., during the manufacture of the service unit and the service channel.

The installation is realized by simply pressing the service unit 100 upward. The contacting takes place in the same step. The assembly fixes itself and the gravitational force promotes the positive fit. The contacting is protected and shielded. The arrangement can be easily unlocked without requiring a special tool.

The service channel consists of a mounting profile that is arranged underneath the Hatrack over the entire X-length and features a fixed plug within certain regular intervals.

On their upper side, the electrified PSUs feature inserted strip conductors that extend over the entire X-length of the PSUs and are automatically and positively contacted when they are interlocked in the installation position.

The length of the individual PSUs needs to be realized such that each PSU is serviced by at least one plug. Each plug is programmed in dependence on the aircraft layout such that the contacted PSU is activated in accordance with its function. This design ensures that the installation time is significantly reduced, namely also in a conservative system architecture (in which each device features its own databus in the form of individual wiring).

No free cable end needs to be tied up and no separate mating of electric connectors is required. The adapted design of the plastic wall thicknesses results in a self-supporting and inherently stable framework without any degrees of freedom. The compensation of tolerances and the disassembly are made possible due to corresponding shaping (integral hinges, compensation elements).

The positioning of the PSUs in the X-direction is fixed by means of the fine teeth that are rolled on during the continuous casting process. The contact between the underside of the Hatrack and the strip conductor integrated into the roof profile of the PSU is realized by means of the plug, namely spring-loaded contacts integrated into the plug.

The overall framework consisting of panel, roof profile and mounting profile results in a non-positive connection that always ensures the contacting. In order to unlock the arrangement, the lateral unlocking surfaces of the PSU-panel are pressed upward such that the PSU can be downwardly removed in accordance with the principle of an integral hinge.

In another design, the profiles, if sealed accordingly, make it possible to accommodate an "Individual Air Channel" without requiring separate piping.

The following advantages, in particular, are attained due to all these measures:

- Mounting, contacting and, if applicable, piping can be realized in one step at the respectively intended position.
- Simply pressing the PSU upward for its installation, as well as reliable positioning in the Y/Z-direction, due to the pre-centering on the catch hooks and the plug guides.
- Reliable positioning in the X-direction by means of rolled-on fine teeth for fixing purposes.
- Simple and cost-effective continuously cast plastic components that are open on both sides in the form of a self-supporting, flexible framework.
- The assembly furthermore is inherently stable without requiring additional fastening or reinforcing parts.
- The gravitational force promotes the positive fit, i.e., the PSU-panel presses downward into the interlocked position such that the mounting is realized redundantly.
- The electric contacts are protected against moisture, jump sparks and operating errors. The contacting is furthermore mechanically protected and ensured at all times due to the non-positive connection between the PSU and the mounting profile.
- No free cable end needs to be tied up and no separate mating of electric connectors is required. The current conservative system architecture can be preserved. The system is also suitable for new databus systems (Ethernet). The arrangement can furthermore be easily unlocked without requiring a special tool. The mounting elements and the rail profiles are not visible from below.
- The system is suitable for preassembly that takes place inside the aircraft, as well as outside the aircraft. At locations that merely require a non-functional infill panel, the roof profile does not contain any inserted strip conductors 107 such that the weight can be reduced.
- In another embodiment, the profiles, if sealed accordingly, make it possible to accommodate an "Individual Air Channel" without requiring separate piping.
- The suitable design of the plastic wall thicknesses results in a self-supporting and inherently stable framework without any degrees of freedom.
- The installation times within the aircraft are reduced.
- The required components are simplified in comparison with conventional components. In addition, a multiple integration of functionalities is realized such that the number of components and interfaces is reduced and physical effects are utilized.
- The inventive components (service unit and service channel) are suitable for the preassembly of large Hatrack modules outside the aircraft (e.g., directly at the module supplier).
- The current Airbus system architecture (CIDS) can be preserved.
- During the installation and the reconfiguration, no manipulation of aircraft hardware is required—only a centralized software adaptation (CIDS) needs to be carried out.

Figure 9:
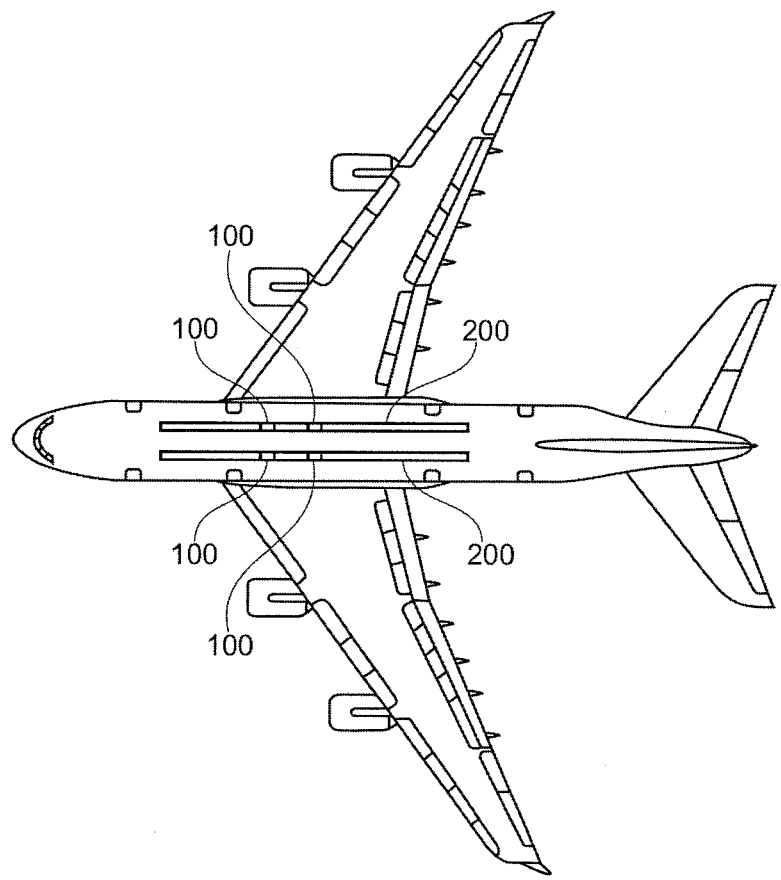
FIG. 9 shows an aircraft according to one exemplary embodiment of the invention.

FIG. 9 shows an aircraft according to one exemplary embodiment of the invention which features a plurality of service units 100 and several service channels 200. The service channels 200 naturally may also be realized longer or shorter. It would also be possible to provide more than two service channels. Additional service units 100 may also be connected to the service channels 200.

Figure 10:
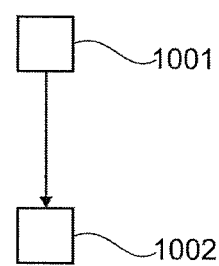
FIG. 10 shows a flow chart of a method according to one exemplary embodiment of the invention.

FIG. 10 shows a flow chart of a method, in which the service unit is moved toward the service channel in step 1001. This movement takes place, for example, linearly in the Z-direction. The service unit is mounted on the service channel and several service elements are at the same time automatically connected to the service channel in the same step 1002.

As a supplement, it should be noted that "comprising" and "featuring" do not exclude any other elements or steps, and that "a" or "an" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

The invention claimed is:

1. A service unit for being installed on a service channel of a means of transport and the service channel, the service unit comprising:
   at least one service element for a passenger;
   a mounting device for mounting the service unit on the service channel;
   a roof profile;
   a profile in the roof profile of the service unit, the profile having a V-shaped cross section and extending in the longitudinal direction of the service unit, the profile being adapted for pre-centering the service unit in the lateral direction of the service unit before mounting the service unit on the service channel; and
   a connecting device for automatically connecting the at least one service element to the service channel;
   wherein the service unit and the service channel cooperate in such a way that the mounting and the automatic connecting are realized in one step.

2. The service unit of claim 1, wherein the at least one service element is selected from the group consisting of illumination unit loudspeaker unit, symbol, air nozzle, and a combination thereof.

3. The service unit of claim 1,
   wherein the service unit has a longitudinal direction;
   wherein a first service element is an electric consumer; and
   wherein the connecting device for automatically connecting the electric consumer to the service channel comprises at least one contact that extends in the longitudinal direction and is adapted for automatically electric contacting of the electric consumer during the mounting of the service unit.

4. The service unit of claim 1,
   wherein a second service element is an air nozzle for providing an air current for a passenger;
   wherein the service unit comprises a channel for supplying the air from a pressurized region of the service channel to the air nozzle;
   wherein the channel is designed for automatically producing a mechanically tight connection between the air nozzle and the pressurized region during the mounting of the service unit.

5. The service unit of claim 1, wherein the mounting device comprises a snap-on device that extends in the longitudinal direction of the service unit.

6. The service unit of claim 1, wherein the service unit is already completely preinstalled on the service channel before mounting such that no additional installation steps are required after the mounting and the thusly realized automatic connection.

7. The service unit of claim 1, further comprising:
teeth for fixing the service unit in the longitudinal direction after the mounting.

8. The service unit of claim 1, wherein the means of transport is an aircraft.

9. The service unit of claim 1, wherein the service channel comprises:
a receptacle device for fixing the service unit with the aid of the mounting device; and
at least one interface for automatically connecting a service element of the service unit to the service channel;
inner mounting profiles for engaging corresponding profiles in the roof profile of the service unit the inner mounting profiles being adapted for pre-centering the service unit in the lateral direction of the service unit before mounting the service unit.

10. The service unit of claim 9, wherein the service channel comprises a first interface for the automatic electric contacting of an electric consumer of the service unit during the mounting of the service unit.

11. The service unit of claim 9, further comprising:
a pressurized region;
wherein the service channel comprises a second interface that is designed for automatically producing a mechanically tight connection between an air nozzle of the service unit and the pressurized region during the mounting of the service unit.

12. An aircraft comprising at least one service unit of claim 1.

13. A method for installing a service unit on a service channel of a means of transport, the method comprising:
pre-centering the service unit in lateral direction of the service unit before mounting the service unit, by engaging inner mounting profiles of the service channel with corresponding profiles in a roof profile of the service unit having a V-shaped cross section;
mounting the service unit on the service channel;
automatically connecting a first service element to the service channel during the mounting step;
wherein the service unit and the service channel cooperate in such a way that the mounting and the automatic connecting are realized in one step.

14. The method of claim 13, further comprising:
automatically connecting a second service element to the service channel during the mounting step.

* * * * *

UNITED STATES PATENT AND TRADEMARK OFFICE
CERTIFICATE OF CORRECTION

| | |
|---|---|
| PATENT NO. | : 8,474,755 B2 |
| APPLICATION NO. | : 13/130433 |
| DATED | : July 2, 2013 |
| INVENTOR(S) | : Uwe Schneider |

It is certified that error appears in the above-identified patent and that said Letters Patent is hereby corrected as shown below:

In the claims,

Column 9, line 21, insert -- , -- between "unit" and "the".

Signed and Sealed this
Seventeenth Day of November, 2015

Michelle K. Lee
*Director of the United States Patent and Trademark Office*